United States Patent [19]

Johansson et al.

[11] Patent Number: 4,979,532

[45] Date of Patent: Dec. 25, 1990

[54] JOINTING DEVICE FOR TENTS, COVERS ETC.

[75] Inventors: Tommy K. G. Johansson, Trelleborg; Siw K. E. Olsson, Ystad, both of Sweden

[73] Assignee: Trelleborg AB, Trelleborg, Sweden

[21] Appl. No.: 367,015

[22] Filed: Jun. 16, 1989

[30] Foreign Application Priority Data

Jun. 29, 1988 [SE] Sweden ............................ 8802470

[51] Int. Cl.$^5$ .......................................... E04H 15/18
[52] U.S. Cl. ..................................... 135/97; 135/119; 403/288
[58] Field of Search ................ 135/97, 115, 119, 120, 135/DIG. 9; 52/2 R, 2 A; 403/288

[56] References Cited

U.S. PATENT DOCUMENTS 767,763   8/1904  Reinvaldt .......................... 403/288
2,939,467 6/1960  Meyer et al. .
3,254,863 6/1966  Tyler .................................... 52/2 A
3,968,809 7/1976  Beavers .
4,028,853 6/1977  Hickey .

Primary Examiner—David A. Scherbel
Assistant Examiner—Lan Mai
Attorney, Agent, or Firm—Beveridge, DeGrandi & Weilacher

[57] ABSTRACT

A jointing device for tents, covers etc., comprises two overlapping flaps interconnected by a series of yokes. The yokes are attached in spaced-apart relationship to one flap and pushed through corresponding through holes in the other flap. A rope-like member is passed through the yoke portions sticking out of the holes, thereby to hold said flaps together. According to the invention, an inflatable tube-shaped element having through holes is passed over the yokes and positioned between the rope-like member and the overlapping flap portions, or between said overlapping flap portions, and adapted, after inflation, to urge said rope-like member against the yokes to seal the joint between the flaps.

5 Claims, 3 Drawing Sheets

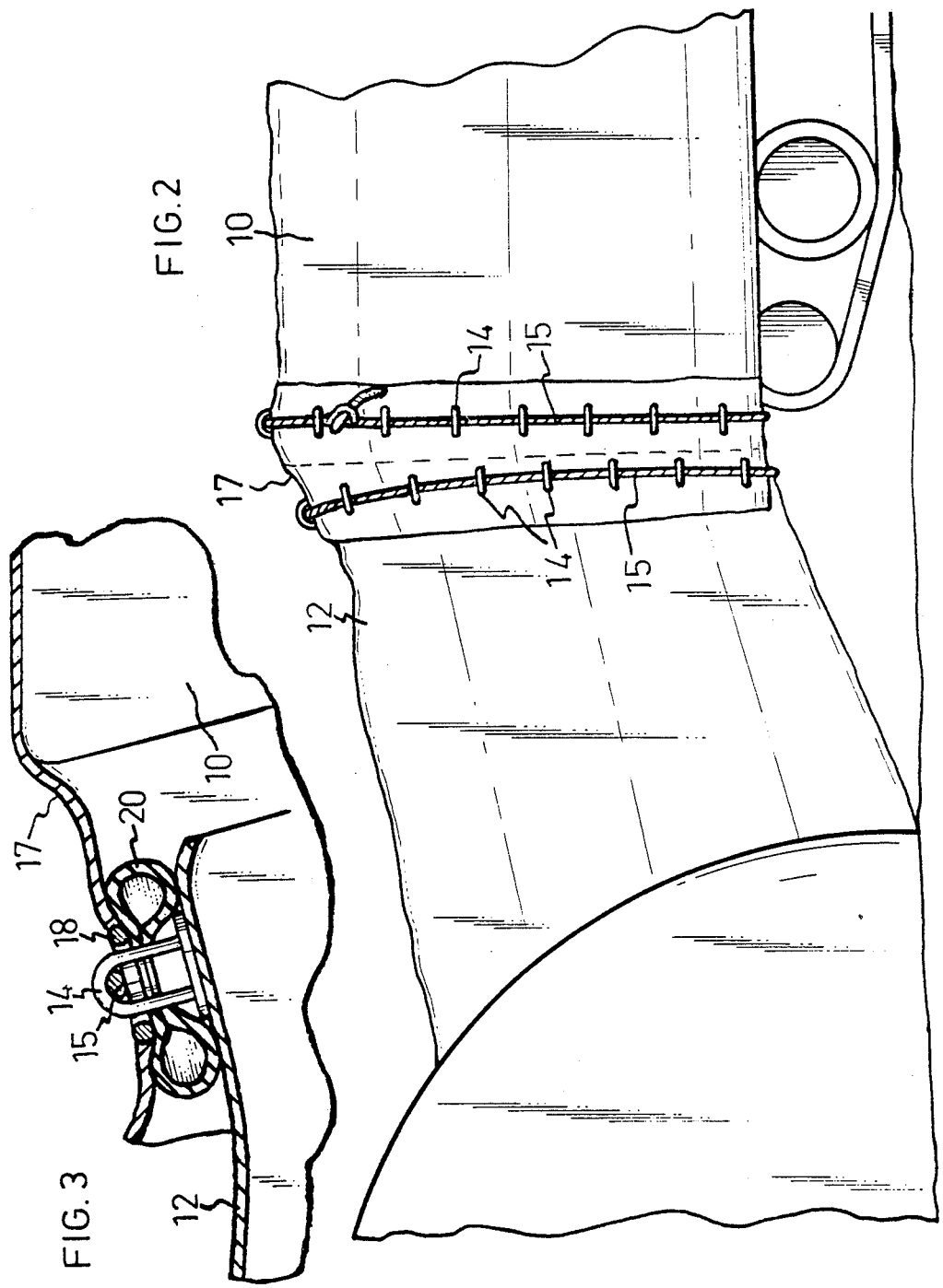

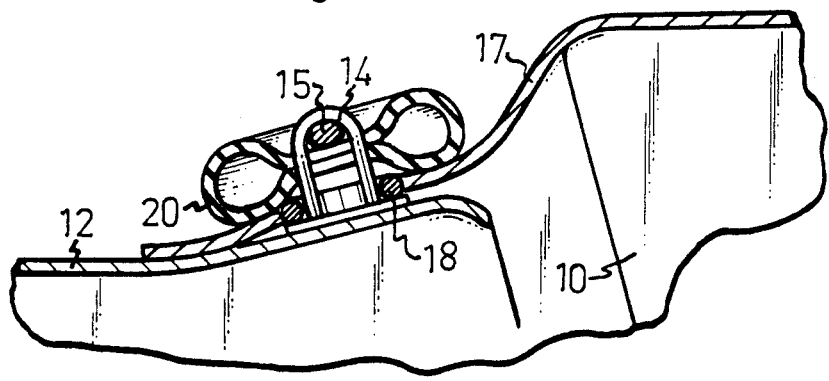
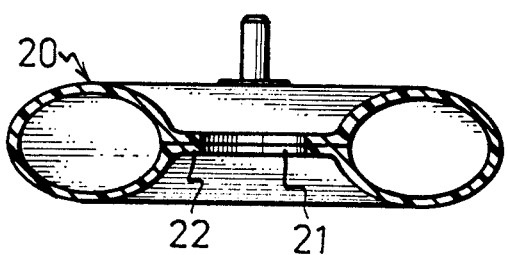
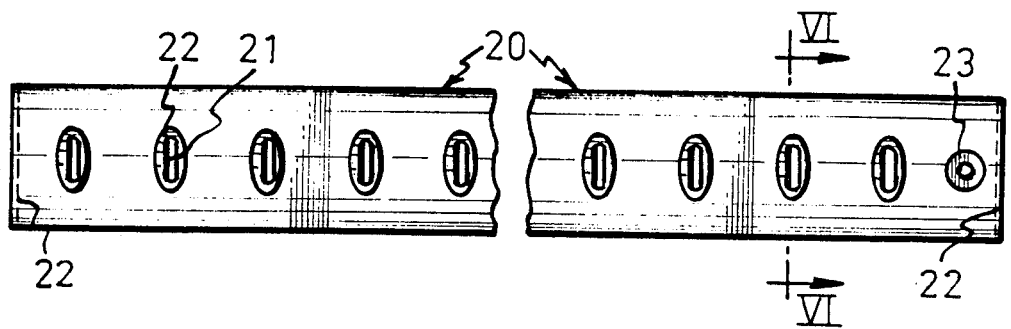

JOINTING DEVICE FOR TENTS, COVERS ETC.

The present invention relates to a jointing device for tents, covers etc., comprising two overlapping flaps interconnected by a series of yokes attached in spaced-apart relationship to one flap and pushed through corresponding through holes in the other flap, a rope-like member being passed through the yoke portions sticking out of the holes, thereby to hold said flaps together.

Jointing devices of this type are in common use for interconnecting military hospital tents, or a tent and a vehicle; see for example SE-B-441,111, SE-B-458,221 and CH-A-214,065. One disadvantage of these jointing devices, at least when used for military purposes, is the constant risk of light leakage through the joint. In SE-B-441,111 this shortcoming has been eliminated by forming one flap with a flap portion which is pressed into sealing engagement with an adjacent tent portion. A joint designed in this manner is highly useful for interconnecting pressurised tents (i.e. tents the interior of which has a higher air pressure than the surrounding atmosphere), but less so for tents of simpler construction. It has also been endeavoured to eliminate this shortcoming by inserting a foamed plastic or foam rubber strip between the flaps in order to provide a sealing effect. However, these attempts have not been very successful because the strip of foam material makes it very difficult to pass the rope through the yokes, for which reason this solution has been rejected by the users.

U.S. Pat. No. 2,939,467 shows how a truck can be connected to a tent by means of a rigid framework having on its inner side and at its free end an inflatable circumferentially extending tube which upon use is urged against the outer circumferential peripheral surface of the truck rear end.

U.S. Pat. No. 4,028,853 discloses a flexible seal formed between peripheral portions of two flexible sheets by utilising an inflatable tube, the peripheral portions being rolled up together with the tube, and the tube being inflated to form a tight joint. In this disclosure, each sheet is preferably provided with a flap integral with or secured to the sheet, to make these flaps facilitate tight securing of the roll. To make the flexible seal practical, the flexible sheets must have been constructed for this purpose from the very outset.

One object of the present invention is to obviate the shortcomings of prior art joints and to provide a device which is easily and conveniently used and eliminates undesired leakage of light. A further object is to provide a device which, because of its simplicity, can be used with all types of tents, covers etc. without modification thereof. Other objects of the invention will appear from the following description.

The objects of the invention are achieved if the jointing device referred to in the introduction is formed as an inflatable tube-shaped element which has through holes and is passed over the yokes and positioned between the rope-like member and the overlapping flap portions, or between said overlapping flap portions, and adapted, after inflation, to urge said rope-like member against the yokes to seal the joint between the flaps.

It is especially advantageous if the inflatable tube-shaped element is in the form of a weldable or vulcanisable plastic or elastomer material and has welded or vulcanised splices around its through holes.

In order to establish an efficient seal against leakage of light, it is especially preferred to make the tube-shaped element of a nontransparent or opaque material.

The invention will now be described in more detail, reference being had to the accompanying drawings illustrating embodiments of the jointing device according to the invention.

FIG. 2 shows another example of the use of the jointing device according to the invention.

FIG. 3 shows, on a larger scale, an example of the jointing device according to the invention.

FIG. 4 shows another example of the jointing device according to the invention.

FIG. 5 is a plan view of a tube-shaped element comprised by the jointing device according to the invention, in the uninflated state.

FIG. 6 is a section along line VI—VI in FIG. 5 and shows the tube-shaped element in the inflated state.

Figure 1:
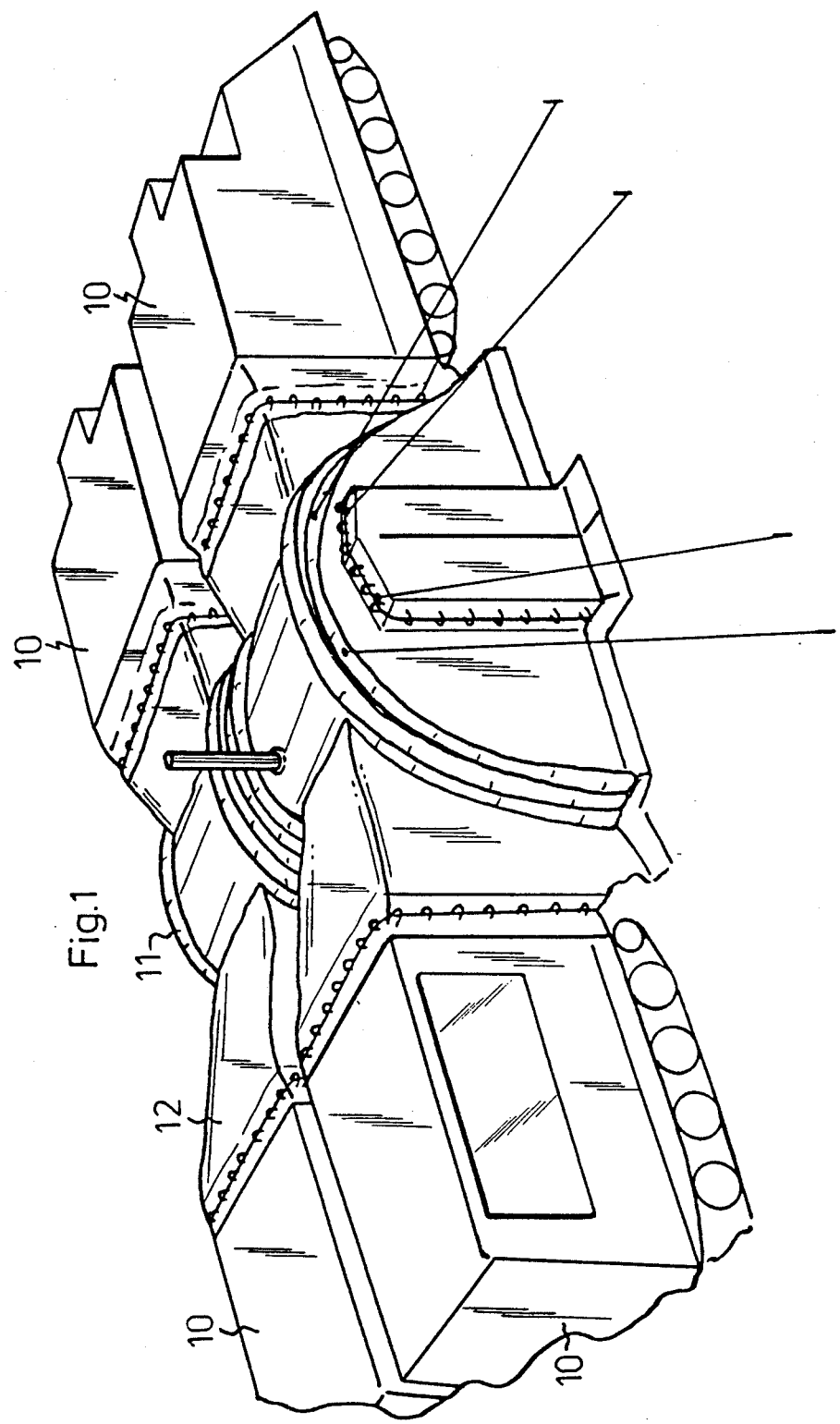
FIG. 1 shows a tent arrangement with jointing devices according to the present invention.

FIG. 1 shows a tent unit comprising a number of coupled-together vehicles 10 which may be, for example, staff, repair or radio vehicles. The vehicles are connected to a central tent 11 which, in the embodiment illustrated, is composed of tent sections, preferably of the type shown in SE-B-441,111. The central tent has connection tubes 12 adapted to be sealingly connected to the vehicles 10 in such a manner that free communication is established between the vehicles and the central tent. The connection must be impermeable to light and gas. To this end, the connection tubes have been formed, in accordance with FIG. 2, with such a peripheral length that they can be placed around the vehicle bodies and, if necessary, arranged in folds to enable adaptation to vehicles of different sizes. The tight connection is achieved in that the connection tubes have been provided at their free ends with fixed yokes 14 through which a clamping device in the form of a rope-like member 15 is passed. In the embodiment illustrated, the clamping device is a conventional rope, but it could also be a strapping device of the type that is used for securing goods on a truck. To form the lap joint between associated flaps, the yokes 14 are carried by one flap or by the vehicle body, and the other flap has been provided with eyelets 18 around holes spaced-apart along the flap a distance corresponding to that of the yokes.

According to the invention, a tube-shaped element 20 has been passed over the yokes 14 before the eyelets 18 of the flap 17 have been passed over the yokes 14; see FIG. 3. When the rope 15 is in position, the tube-shaped element 20 is inflated to urge the rope against the outer end of the yoke. At the same time, a reliable light seal is obtained in the joint area between the two flaps 12 and 17.

FIG. 4 illustrates a different way of positioning the inflatable sealing element 20 in the joint area. Thus, it is possible first to pass the flap 17 and the eyelets 18 over the yokes 14, whereupon the tube-shaped element 20 is placed over the yokes before the rope 15 is passed through these yokes. Like before, the tube-shaped element is inflated only when the rope 15 is in position.

FIG. 5 illustrates an example of a tube-shaped element 20 adapted to be used with the jointing device according to the invention. The tube consists of a weldable or vulcanisable elastomer or plastic material and is shown in FIG. 5 in lay-flat condition. As can be seen in FIG. 5, the tube has a series of holes 21 sealed against the tube interior by welded or vulcanised splice areas 22 around each hole. Similar splice areas 22 occur at the tube ends. Near one end of the tube, or at some point along the tube, a valve 23 is mounted for inflation and deflation of the tube-shaped member. FIG. 6 is a section along line VI—VI after the tube has been inflated.

We claim:

1. A jointing device, comprising:
   a first flap having a series of yokes in spaced apart relationship;
   a second flap overlapping said first flap, and said second flap having a series of through-holes formed therein through which said yokes are adapted to pass;
   a rope-like member adapted for passage through said yokes so as to hold said flaps in overlapping relationship; and
   an inflatable tube-shaped element having a plurality of through-holes formed therein which are adapted to receive said yokes therethrough, said inflatable tube-shaped element being positioned so as to be in contact with an overlapping portion of at least one of said flaps, and said inflatable tube-shaped element being adapted, after inflation, to urge said rope-like member against said yokes to seal the joint between said first and second flaps.

2. A jointing device as claimed in claim 1 characterized in that the inflatable tube-shaped element (20) is in the form of a weldable or vulcanisable plastic or elastomer material and has welded or vulcanised splices (22) around its through holes (21).

3. A jointing device as claimed in claim 1, characterized in that said tube-shaped element (20) is made of a nontransparent or opaque material.

4. A jointing device as recited in claim 1, wherein said inflatable tube-shaped element is positioned between said rope-like member and the overlapping portion of said flap having a series of through-holes formed therein.

5. A jointing device as recited in claim 1, wherein said inflatable tube-shaped element is positioned between said overlapping flap portions.

* * * * *